E. C. KLINE.
METALLIC CONTAINER.
APPLICATION FILED MAR. 2, 1914.
1,148,238.
Patented July 27, 1915.
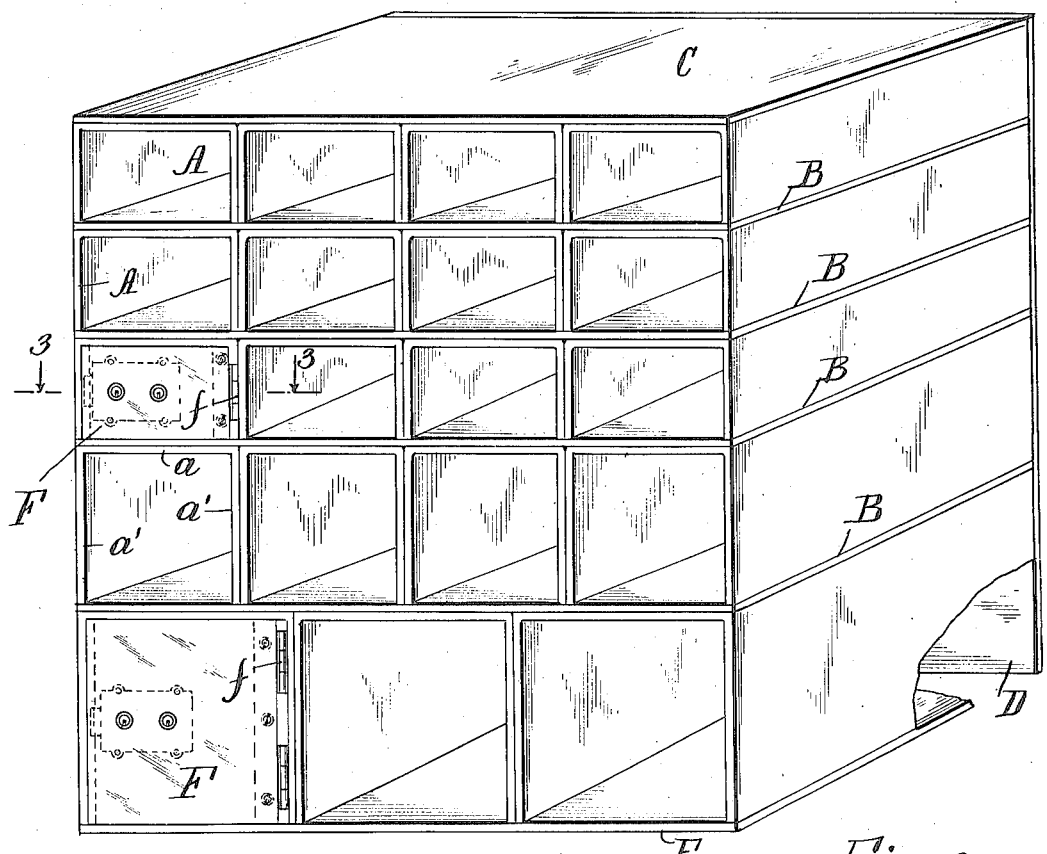
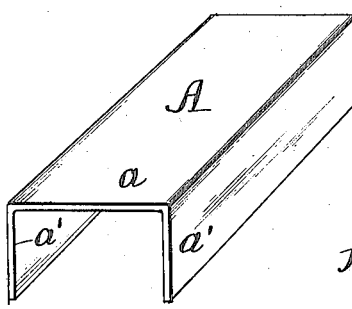
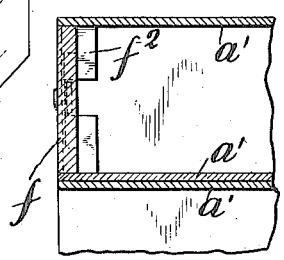
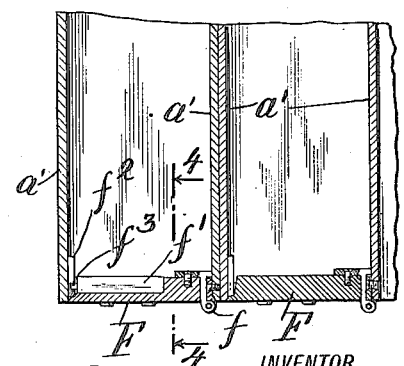
WITNESSES
INVENTOR
BY
ATTORNEYS

UNITED STATES PATENT OFFICE.

EVERETT C. KLINE, OF CINCINNATI, OHIO, ASSIGNOR TO THE VICTOR SAFE & LOCK COMPANY, OF CINCINNATI, OHIO, A CORPORATION OF OHIO.

METALLIC CONTAINER.

1,148,238.　　　　　Specification of Letters Patent.　　Patented July 27, 1915.

Application filed March 2, 1914. Serial No. 821,844.

*To all whom it may concern:*

Be it known that I, EVERETT C. KLINE, a citizen of the United States, residing at Cincinnati, in the county of Hamilton and State of Ohio, have invented certain new and useful Improvements in Metallic Containers, of which the following is a specification.

This invention, although capable of use in other connections, is particularly designed for employment in the construction of casings or cabinets for containing safe-deposit boxes, file-boxes and the like.

The object of the invention is to construct a container or casing wholly or largely of metal, of simple and compact form, characterized, however, by adequate strength and low cost of manufacture and assembly.

The invention is illustrated in the accompanying drawings, in which—

Figure 1 is a perspective view of a casing, or portion of a casing, employing my invention; Fig. 2 is a similar view, showing one of the elements employed in the construction of said casing; Fig. 3 is a section on the line 3—3 Fig. 1; and Fig. 4 is a section on the line 4—4 Fig. 3.

Referring to these drawings, in which similar letters of reference denote corresponding parts, it will first be noted that the casing is or may be made up of a series of units capable of practically indefinite extension. A preferred form of such unit is shown at A and is best illustrated in Fig. 2. It comprises a channel-section having the horizontal portion $a$ and perpendicular portions $a'$, $a'$. As many of these units as are desired to form the casing, depending of course upon the capacity desired for the completed structure, are combined and assembled with other elements now to be described, as illustrated in Fig. 1.

In Fig. 1 I have shown a horizontal series of four of the sections A, arranged initially with their open portions downward and seated upon a metallic partition B. In this position, the lower edges of the sides $a'$, $a'$ of the sections are permanently secured to said partition B in any suitable manner. I prefer to employ for this purpose the process of welding as practised either by electric welding machines or by the use of oxy-acetylene flame. If desired, for greater stability, the abutting side portions $a'$ of each pair of sections A may additionally be secured together either in the manner above indicated or in other suitable manner, although ordinarily this will be found unnecessary. Also, if desired, the casing may be made up in sections such as that illustrated by the upper horizontal series of boxes in Fig. 1, such series in this case forming the unit and being joined to one or more similar underlying units. In this case, it is, or may be, desirable to secure each of the series to the next adjacent series in suitable manner, as, for instance, by welding the central portion $a$ of each of the sections A to the under side of the partition B. The upper series of sections A being also welded or otherwise secured to said partition, this operation results in combining the series so constituted in permanent and durable manner.

I preferably employ a top-plate C, for additional strength and to act as a finish for the container as a whole; also a back-plate D. The former may, if desired, be welded or otherwise secured to the portions $a$ of the horizontal series of channels A, while the latter may be secured, as by welding, to the rearward edges of said sections A or to the corresponding edges of the partitions B.

As will be seen (Fig. 1), the channel-sections A may be of any desired size, adapting them to receive files or boxes of different capacity. The enlarged channels shown in the lower portion of Fig. 1 may be secured in position in the manner indicated above with respect to the channels A, and the lower edges of the side portions of the lowermost sections are secured, as by welding, to a bottom-plate E, which bottom-plate, as well as the top-plate C, may, if desired, be suitably molded or ornamented to form a finish for the structure as a whole.

While the parts thus far described will, after completion of the process of assembly, result in the production of a finished container or casing, I may, if desired, add thereto suitable side-plates (not shown), these being in essence practically the same as the plates C and E, save that they will be secured, as by welding, to the sides of the completed container. Or, if desired, such side-plates may be detachably connected so that a series of containers, each, for example, such as that shown in Fig. 1, may be arranged side by side, with substantially no break, so far as concerns their appearance, in the continuity of the whole installation so made up.

When the container or casing herein described is intended for use for holding safe-deposit boxes, I provide each of the channel-sections A with a door F. As shown in Figs. 1 and 3, each door is hinged, as at $f$, to one of the side-members $a'$ of a section A, and is provided with the customary master-key lock $f'$. I also, in such case, provide the opposite member $a'$ of each channel-section A with a locking-bar $f^2$ (best shown in Fig. 4), recessed intermediate of its ends for coaction with the bolt $f^3$ of the lock $f'$. This locking-bar is preferably secured to the member $a'$ during the process of assembly, and when the process of welding is employed, as above indicated, said bar may be welded to the side-member $a'$ and also the partition B simultaneously with the welding of the member $a'$ to such partition. The employment of the locking-bar $f^2$ not only provides parts adapted for coaction with the lock $f'$, but, in addition, greatly strengthens the structure as a whole.

While I have hereinabove described the channel-sections A as being assembled with their openings downward, it is apparent that such position might, if desired, be reversed, in which case the process of assembly would be substantially the same (save, of course, that said sections would be joined to the under sides of the partitions B), and the resulting structure as a whole would be in every practical sense the equivalent of that above described.

Having now described my invention, what I claim as new therein and desire to secure by Letters Patent is as follows:—

1. A casing comprising a horizontal series of metallic channel-sections having horizontal webs and downwardly extending side flanges arranged side by side with their adjacent side flanges closely parallel, a metallic plate parallel to said webs, beneath said sections, to which the bottom edges of said flanges are welded, a second horizontal series of metallic channel-sections, similar to said first series, below said plate, with the webs thereof welded to said plate, a second plate below said second series, to which the bottom edges of the flanges of said second series are welded, and a back-plate welded to rear edges of members of the casing to close the openings in the rearward ends of the units formed by said channel-sections, substantially as set forth.

2. A casing comprising metallic channel-sections arranged in series both horizontally and vertically, said sections having horizontal webs and vertical side flanges, the flanges of sections in each horizontal series being closely adjacent, horizontal metallic plates, one between each of said horizontal series, the sections of horizontal series on both sides of a plate being secured to said plate, a back plate secured to rear edges of members of the casing to close the openings in the rearward ends of the units formed by said channel sections, and doors for the front ends of said sections, substantially as set forth.

3. A casing comprising metallic channel-sections arranged in series both horizontally and vertically, said sections having horizontal webs and vertical side flanges, the flanges of sections in each horizontal series being closely adjacent, horizontal metallic plates one between each of said horizontal series, the sections of horizontal series on both sides of a plate being secured to said plate, doors for closing the openings in the front ends of the units formed by said channel-sections, each door being hinged to one of the side flanges of its channel-section, a locking-bar secured to the inner surface of the other side flange of each section, and a lock carried by each door, adapted to coact with the corresponding locking-bar, substantially as set forth.

This specification signed and witnessed this 24th day of February, 1914.

EVERETT C. KLINE.

Witnesses:
   Thomas S. Spivey,
   Theo. W. Meader.